United States Patent [19]

Brusselmans

[11] 4,195,106

[45] Mar. 25, 1980

[54] HEAT RECOVERABLE ARTICLE

[75] Inventor: Jacques H. F. Brusselmans, Kessel-Lo, Belgium

[73] Assignee: N.V. Raychem S.A., Kessel-Lo, Belgium

[21] Appl. No.: 933,599

[22] Filed: Aug. 14, 1978

[30] Foreign Application Priority Data

Aug. 22, 1977 [GB] United Kingdom ............... 35161/77

[51] Int. Cl.$^2$ ..................... H02G 13/06; B32B 31/00; B29C 27/00
[52] U.S. Cl. ........................................ 428/35; 156/84; 156/85; 156/86; 174/84 R; 174/DIG. 8; 428/36; 428/913
[58] Field of Search ............ 174/84 R, 88 R, DIG. 8; 156/84, 85, 86; 428/36, 913, 35

[56] References Cited

U.S. PATENT DOCUMENTS

| | | | |
|---|---|---|---|
| 3,312,772 | 4/1967 | Sherlock | 174/DIG. 8 |
| 3,525,799 | 8/1970 | Ellis | 174/DIG. 8 |
| 3,582,457 | 6/1971 | Barthell | 174/DIG. 8 |
| 3,957,382 | 5/1976 | Grevel, Jr. et al. | 174/DIG. 8 |
| 4,016,356 | 4/1977 | McLoughlin | 174/DIG. 8 |

Primary Examiner—William R. Dixon, Jr.
Attorney, Agent, or Firm—Lyon & Lyon

[57] ABSTRACT

A heat-recoverable sleeve having a meltable or softenable insert inside it, a thermal barrier being located between the sleeve and the insert. The barrier may be crosslinked thermoplastic netting, and the sleeve may be transparent.

15 Claims, 1 Drawing Figure

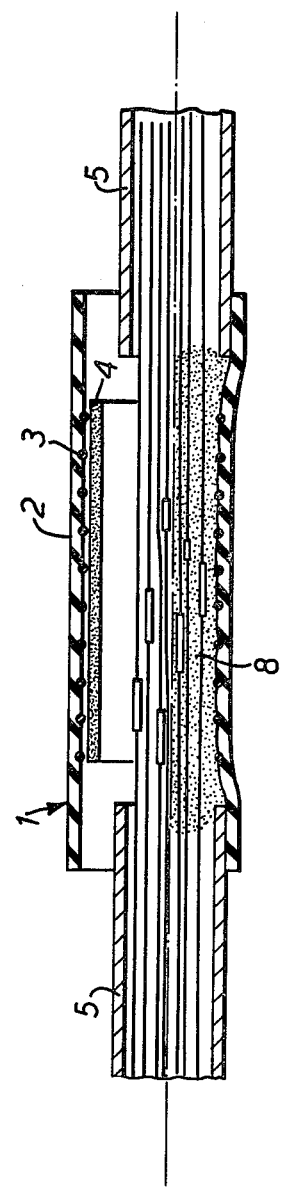

HEAT RECOVERABLE ARTICLE

This invention relates to heat-recoverable articles, and to methods of covering a substrate therewith.

Heat-recoverable, especially shrinkable, articles, for example heat-shrinkable sleeves, have achieved wide acceptance in many industries for covering substrates, especially elongate substrates, for example gas and oil pipes and electrical cables for both power and telecommunications. Heat-shrinkable sleeves are used, for example, to protect such substrates and where necessary provide electrical insulation, at junctions between substrates or at a damaged portion of a single substrate. To provide environmental sealing for a substrate, the sleeve may be provided with an internal coating, or liner; the sleeve may also contain an insert which when the sleeve is heated to cause recovery acts in some way on the substrate or between the substrate and the sleeve.

The present invention in one embodiment provides a heat-recoverable article having an insert, the purpose of which is to fill the spaces between the individual conductors in a cable at a junction. The article is especially useful for use with telecommunication cables, which may have, for example 20 pairs of wires—40 conductors, the ends of which are each joined to corresponding wires of another cable at a junction, for example an in-line splice between them. The hot-melt adhesive is employed, for example, to provide sealing between a pressurised cable and an unpressurised cable at a junction between them. It will be appreciated that, to achieve sealing, it is necessary to ensure that the adhesive reaches the inner most portions of the cable. Although the insert in the embodiment to be described comprises a hot-melt adhesive, which is solid at room temperature and up to the maximum service temperature of the cable, the insert may be any heat-meltable or heat-softenable material that undergoes a reduction in viscosity with increase of temperature to a particular value, or range, and the invention is not limited to any particular softenable or meltable insert. The insert is normally a tube coaxial with and located within the heat-recoverable article, which is itself also normally tubular; it will be understood, however, that the invention is not to be regarded as limited to tubular heat-shrinkable articles although the description that follows will refer to articles of this shape for simplicity.

During application of the article, the hot-melt adhesive of the embodiment to be described has to be heated to a temperature sufficient to cause it to melt and flow into the spaces between the individual conductors which are of course thermally conductive as well as electrically conductive, and act as a heat sink. Therefore, more heat has to be applied than is sufficient simply to melt the insert, or the material would only flow part way into the substrate and solidify before reaching the inner region of the splice. Accordingly, heating has to be continued for a prolonged period, and there is a danger that the insulation surrounding the conductors may be damaged by the temperatures reached by the tube during heating, if the insulation has a melting point lower than the temperature required to ensure proper application of the article, as is often the case.

The present invention provides an article comprising a hollow heat-recoverable member, a meltable or softenable insert positioned in the direction of heat recovery of the member and, between the member and the insert, a thermal barrier.

Advantageously the member, barrier and insert are all tubular and coaxial, and preferably the member is heat-shrinkable. The length of the member is preferably greater than that of either the barriers or the insert, and the barrier is preferably longer than the insert.

Advantageously, the member is transparent, to allow visual inspection of the article during or after recovery to determine whether proper melting and flowing of the insert have occurred without damage to a substrate over which the article is being or has recovered. In this case, the construction of the thermal barrier must be such as not to prevent such inspection, e.g., it is transparent or has interstices.

The optimum material, dimensions, and thermal properties of the barrier may be determined for any particular application by simple routine experiment. Generally, the barrier should be capable of preserving its structural cohesion at the application temperature of the article. In the embodiment to be described in detail below, the barrier comprises a tubular net of a crosslinked thermoplastic material which has a softening point or crystalline melting point below the recovery temperature of the member, so as not to prevent recovery. Being crosslinked, however, it will remain as a net during and after application. The wall thickness and the size of the interstices between the intersections will affect the mechanical and thermal properties, as well as the ability to inspect the resulting product.

If the barrier is readily compressible, it may have a crystalline melting, or softening, point above the temperature of recovery.

The thermal barrier may, although this is not at present preferred, to be integral with the member, for example, as internally projecting bosses or ridges; they must of course function during recovery and any subsequent heating to affect the heat transfer to the substrate from the member.

In a specially advantageous embodiment of the invention, there is provided an article comprising a transparent heat-shrinkable tubular sleeve, having positioned coaxially therein in contact with its inner surface a tubular, crosslinked thermoplastic net having a softening point lower than the recovery temperature of the member and, in contact with the inner surface of the net, and coaxial with the net, a tubular insert comprising a hot-melt adhesive.

Advantageously, neither the insert nor the barrier extends to either end of the sleeve, and preferably the insert does not extend to either end of the barrier.

The invention also provides a method of covering a substrate which may be damaged at the recovery temperature of a heat-recoverable article, which comprises positioning an article constructed in accordance with the invention about the substrate, and heating to cause recovery of the member and melting or softening of the insert without causing damage to the substrate.

One form of article constructed in accordance with the invention will now be described in greater detail, by way of example only, with reference to the accompanying drawing, which is a schematic representation in longitudinal section of an article positioned around an in-line splace between two multi-way cables. The upper half of the FIGURE represents the assembly before recovery, the lower half the assembly after recovery.

Referring now to the upper half of the drawing, a heat-recoverable article, indicated generally by the reference numeral 1 tubular heat-shrinkable sleeve 2, of transparent polyvinylidene fluoride, has positioned on the central region of its inner surface a tubular net 3 of crosslinked polyethylene. On the inner surface of the net 3 is positioned a tubular insert 4 of hot-melt adhesive. The article may be constructed, for example, by partial recovery of the sleeve 2 over the insert 4 and the net 3 while they are supported on a mandrel.

The article 1 is shown positioned over an in-line splice of a pair of cables each comprising an outer jacket 5 and a number of inner pairs of insulated conductors 6, the conductors 6, 6 of the two cables being shown, schematically, at splices 7.

In operation, the article is positioned as shown, and heated. The ends of the sleeve 2 recover over the jackets 5 of the cables, forming dam means which inhibits escape of the insert 4 which melts and is forced by the recovering sleeve 2 between the several conductors 6 to form a sealing block 8, the final position of the sleeve on the splice being as shown in the lower half of the FIGURE. The net 3 has prevented damaging heat transfer from the recovering and recovered sleeve 2 to the insulation of the conductors 6, while allowing sufficient heat to be transmitted to the hot-melt adhesive of the insert 4.

While the applicants are not to be bound by any theory, it is believed that the gaps in the net cause "wicking" of the insert when melted, which controls its flow in a desired manner, inhibiting passage toward the ends of the sleeve; some molten material may also remain within gaps to provide desired continuity of heat transfer paths to the remainder of the molten material as it is urged between the conductors under the forces of recovery of the sleeve.

The heat-recoverable member is advantageously polymeric, preferably crosslinked, and may be, for example, any of the materials disclosed in British Patent Specification Nos. 990,235 or 1,062,043.

I claim:

1. An article comprising a polymeric, hollow, heat-recoverable member that recovers radially, a heat-softenable insert positioned within the member, and, positioned between the heat-recoverable member and the insert, a separate thermal barrier comprising a polymeric material, the barrier being capable of preserving its structural cohesion at the application temperature of the article without preventing recovery of the heat-recoverable member.

2. An article as claimed in claim 1, wherein the member, the insert and the barrier are coaxial tubes.

3. An article as claimed in claim 1, wherein the insert is a hot-melt adhesive.

4. An article as claimed in claim 1, wherein neither the insert nor the barrier extends to the ends of the member.

5. An article as claimed in claim 4, wherein the insert does not extend to the ends of the barrier.

6. An article as claimed in claim 1 wherein the insert is heat-meltable.

7. An article as claimed in claim 1, wherein the member is heat-shrinkable and transparent.

8. An article as claimed in claim 7, wherein the barrier is transparent.

9. An article as claimed in claim 7, wherein the barrier has gaps so as to allow visual inspection of the insert.

10. An article as claimed in claim 7 or 9, wherein the barrier is cross-linked thermoplastic netting, having a softening point or crystalline melting point below the recovery temperature of the member.

11. A method of covering a heat-sensitive substrate comprising the steps of:
 (a) placing about the substrate an article comprising a polymeric, heat-recoverable member containing both a heat-softenable insert and a separate thermal barrier between the member and the insert, the barrier being capable of preserving its structural cohesion at the application temperature of the article without preventing recovery of the heat-recoverable member; and
 (b) applying heat from a heat source to the article to soften the insert and to recover the member, the heat barrier allowing sufficient heat to be transferred to soften the insert but preventing heat from damaging the heat-sensitive substrate, either by contact with the hot, heat-recovered member, or direct from the heat source.

12. The method of claim 8 wherein the insert is heat-meltable and the step of applying heat comprises melting the insert.

13. An article comprising a hollow, polymeric heat-recoverable member and a heat-softenable polymeric insert positioned in the direction of recovery of the member, the heat-recoverable member having as a thermal barrier polymeric projections extending in the direction of recovery of the member, the projections functioning during recovery of the member to transfer heat to the insert.

14. The article of claim 13 in which the insert is heat-meltable.

15. An article comprising:
 (a) a polymeric, transparent, hollow, tubular, heat-shrinkable member that shrinks radially;
 (b) a hot-melt adhesive insert positioned in the direction of recovery of the member; and
 (c) positioned between the heat-recoverable member and the insert, a separate thermal barrier comprising cross-linked thermoplastic netting having a softening point below the recovery temperature of the heat-recoverable member, the netting being capable of preserving its structural cohesion at the application temperature of the article without preventing shrinkage of the heat-shrinkable member, the netting having gaps so as to allow visual inspection of the insert.

* * * * *